United States Patent
Pinheiro et al.

(10) Patent No.: US 10,608,889 B2
(45) Date of Patent: Mar. 31, 2020

(54) HIGH-LEVEL INTERFACE TO ANALYTICS ENGINE

(71) Applicant: HEWLETT PACKARD ENTERPRISE DEVELOPMENT LP, Houston, TX (US)

(72) Inventors: David Rodrigues Pinheiro, Santa Clara, CA (US); Renato Cha Aguiar, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 15 days.

(21) Appl. No.: 16/023,567

(22) Filed: Jun. 29, 2018

(65) Prior Publication Data

US 2020/0007404 A1    Jan. 2, 2020

(51) Int. Cl.
| | |
|---|---|
| *G06F 15/173* | (2006.01) |
| *H04L 12/24* | (2006.01) |
| *H04L 12/26* | (2006.01) |
| *H04L 12/911* | (2013.01) |
| *G06F 9/445* | (2018.01) |
| *H04L 29/08* | (2006.01) |
| *G06F 11/36* | (2006.01) |
| *G06F 8/30* | (2018.01) |

(52) U.S. Cl.
CPC .......... *H04L 41/14* (2013.01); *G06F 9/44568* (2013.01); *H04L 41/06* (2013.01); *H04L 43/08* (2013.01); *H04L 47/70* (2013.01); *H04L 67/22* (2013.01); *G06F 8/30* (2013.01); *G06F 11/3612* (2013.01); *H04L 67/10* (2013.01)

(58) Field of Classification Search
CPC ........ H04L 67/22; G06F 11/3612; G06F 8/30; H05L 67/22
USPC ................ 709/220, 224, 226, 228, 234, 246
See application file for complete search history.

(56) References Cited

U.S. PATENT DOCUMENTS

| | | |
|---|---|---|
| 7,469,287 B1 | 12/2008 | Castillo et al. |
| 9,083,562 B2 | 7/2015 | Bates et al. |
| 9,443,192 B1 * | 9/2016 | Cosic ........................ G06N 3/02 |
| 9,942,259 B2 * | 4/2018 | Madhu ................. G06Q 50/265 |

(Continued)

OTHER PUBLICATIONS

ArubaOS-CX Network Analytics Engine Guide for 10.00 (Research Paper), Apr. 2018, 96 Pgs.

(Continued)

*Primary Examiner* — Khanh Q Dinh
(74) *Attorney, Agent, or Firm* — Nolte Intellectual Property Law Group

(57) ABSTRACT

Disclosed are a non-transitory computer readable medium, system, and method to provide a network analytics engine (NAE) and corresponding NAE infrastructure. The NAE infrastructure may determine functions to be offloaded from a high-level interpreted scripting language agent script to specialized executables. The specialized executables may execute and perform functions on behalf of portions of the agent script while the agent script and the interpreter of the agent script are not loaded on the network communication device executing the specialized executables. Callbacks may be provided to invoke portions of the agent script as needed. A plurality of different specialized executables may monitor data values and event evaluation rules on behalf of a set of agent scripts and provide feedback via the NAE.

20 Claims, 10 Drawing Sheets

(56) References Cited

U.S. PATENT DOCUMENTS

| | | | |
|---|---|---|---|
| 10,033,747 B1* | 7/2018 | Paithane | G06F 21/54 |
| 10,313,388 B2* | 6/2019 | Madhu | G06Q 50/265 |
| 2007/0083813 A1* | 4/2007 | Lui | G06F 11/3612 |
| | | | 715/709 |
| 2007/0220494 A1* | 9/2007 | Spooner | G06F 8/30 |
| | | | 717/130 |
| 2008/0120129 A1* | 5/2008 | Seubert | G06Q 10/06 |
| | | | 705/35 |
| 2012/0066378 A1* | 3/2012 | Lui | G06F 11/3612 |
| | | | 709/224 |
| 2014/0282977 A1* | 9/2014 | Madhu | G06Q 50/265 |
| | | | 726/7 |
| 2016/0203575 A1* | 7/2016 | Madhu | G06Q 50/265 |
| | | | 705/319 |
| 2017/0169074 A1 | 6/2017 | Welton et al. | |
| 2017/0249200 A1 | 8/2017 | Mustafi et al. | |

OTHER PUBLICATIONS

Demystifying Network Analytics Understanding How Analytics Should Work is Key to the Future of Network Operations (Research Paper), Apr. 19, 2017, 9 Pgs.

Integrating with Google Analytics (Research Paper), Retrieved May 28, 2018, 6 Pgs.

\* cited by examiner

HIGH-LEVEL INTERFACE TO ANALYTICS ENGINE

BACKGROUND

High-level scripting refers to programs written in a high-level programming language that may be interpreted rather than compiled into a binary executable. Examples of high-level scripting languages include, but are not limited to, PERL, Python, Tool Command Language (TCL), JavaScript, Ruby, etc. In some cases, a small binary executable may run significantly faster and more efficiently than a script written to perform the same function. However, development time requirements for building that executable may be significantly greater than development time for the script. Further, an executable may not be as easily shared throughout a development community. This is in part, because of the fact that scripting languages are human-readable and binary executables are not. A binary executable may contain malicious code that cannot be visually identified whereas a script can be easily read and understood prior to its execution.

In the field of network administration, devices dispersed throughout one or more networks may monitor network and device activities and perform high-level scripting functions to support a network administrator. In different administration environments, different numbers of scripts may be available and may be written by local system administrators or provided by third parties. High-level scripting languages are used, in part, for their ease of development and readability. However, as mentioned above, high-level scripting languages are often interpreted by a command interpreter at run-time and are not binary executables. Thus, there may be additional overhead associated with executing a high-level administration script. This overhead may have at least two contributing factors. The first, as mentioned above, is a run-time overhead because of the interpretation. A second is that the interpreter itself must load and consume resources on the executing device.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
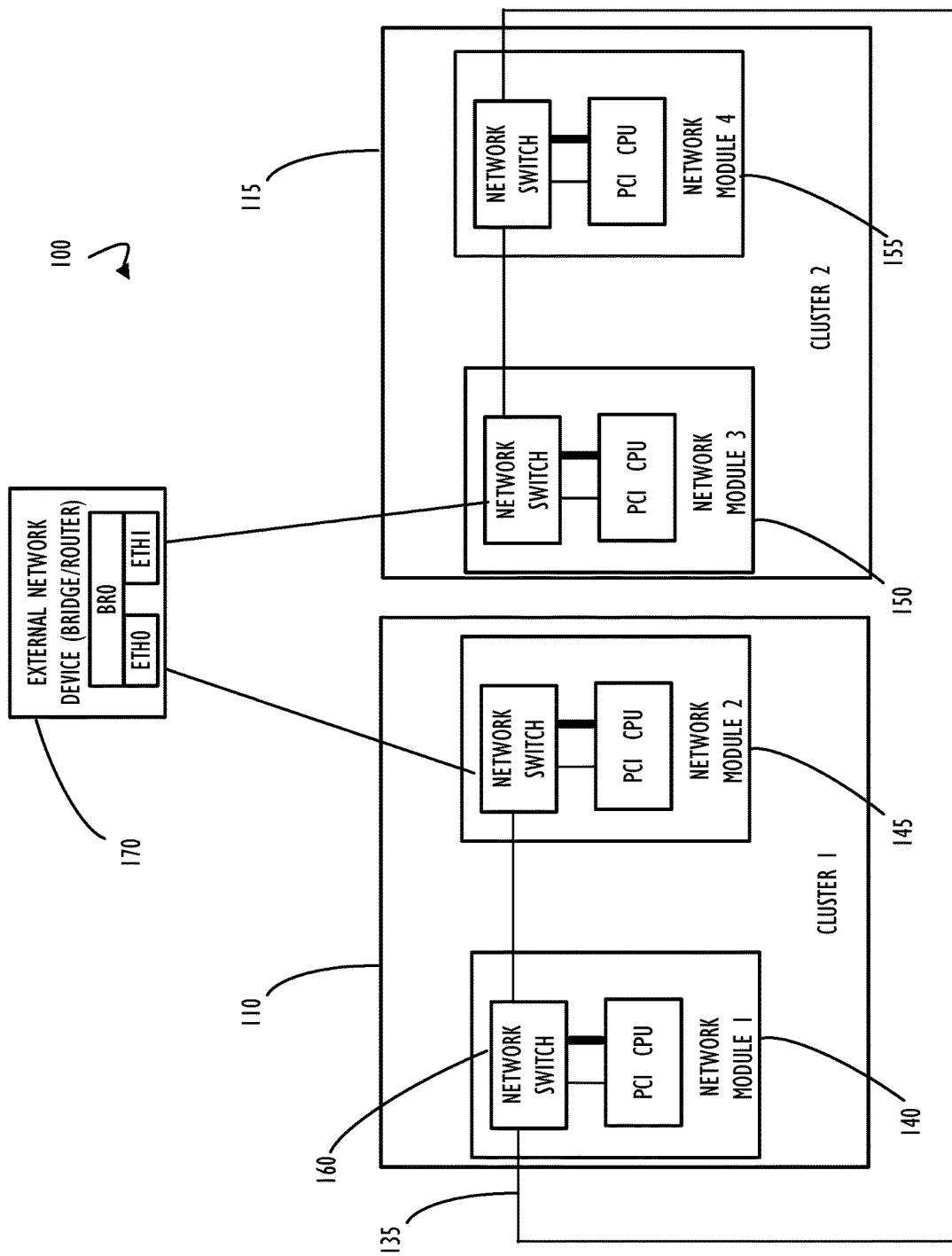
FIG. 1 is a functional block diagram representing an example of different network communication devices including a bridge/router and two network switches for each of two independent frames (or similarly configured blade resources), according to one or more disclosed implementations.

Examples of the subject matter claimed below will now be disclosed and then a specific non-limiting implementation will be explained with reference to the FIGs. In the interest of clarity, not all features of an actual implementation are described in every example of this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In the field of network computing, network connectivity between devices, compute nodes, blades, or frames of a scaleable compute resource may be implemented using a network communication device. Network communication devices, such as switches, routers, hubs, bridges, etc. represent a primary communication path for sharing data between different types of compute resources generically referred to as "nodes" of a network. The shared data may represent inputs to compute processes (e.g., data or applications), outputs of compute resources (e.g., compute results), communications to coordinate distributed processes, communications between users, and other types of data. In any "intelligent" network communication device, there may be a processor, local memory, configuration information, and "current state" information, among other types of information. Collectively, the different types of information on a network device may be considered to represent the overall "device state" at a given point in time. For example, information on a network communication device (including its "device state") is expected to change over time, in part, because while in-service and providing active communication paths for a network, the overall configuration and available devices on that network may change.

In general, a switch may be thought of as a device in a computer network that connects together other devices ("nodes" of the network). Multiple data cables may be plugged into a switch to enable communication between different networked devices. Switches manage the flow of data across a network by transmitting a received network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

Switches, Hubs, Routers, etc. are examples of network communication devices that may benefit from the concepts of this disclosure. Other examples of network communication devices that may also benefit include, but are not limited to: wireless access points, remote access servers, bridges, brouters, etc. Also, some network communication devices do not fit into a single classification and may be hybrids of two classes of devices (e.g., a brouter is a bridge-router hybrid). In general, this disclosure represents an improvement to the art of network computing by providing enhanced diagnostic information that may be used to improve performance, security, and reliability of a network (e.g., a corporate infrastructure network).

To address implementations of an embedded processing environment of a network communication device participating in a monitoring solution, resource constraints may play a role in what monitoring events are processed and which data may be ignored. Ignoring of data may not be desirable and steps may be taken to minimize the amount of ignored data. However, the primary function of a network communication device (e.g., switch, router, bridge) is to provide connectivity for connected devices that are communicating through that network device. Accordingly, collection of historical metrics for analysis, while important, may have to be deferred (or lost) in times of network stress. Disclosed implementations represent an improvement to the art of network management, in part, by introducing high-level script language interface techniques that may be used to offload standard monitoring requests of high-level administration functions to specialize executable binary function implementations (e.g., daemons) to perform functions on behalf of the high-level script. In cases, where actual high-level script processing is required, disclosed techniques for instantiating a high-level script interpreter and providing callback functionality to high-level scripts may be provided by the disclosed network analytics engine (NAE).

The embedded processing environment of a network communication device may be constrained to processing and memory resources available on that network device. That is, a network communication device will have a pre-determined and finite set of local resources that may be used to implement the processing functions of that network communication device. Different network communication devices may have different amounts of local processing capability (e.g., number of processors and number of cores on each processor) and local storage (e.g., volatile or non-volatile memory). In practice, each of these devices is deployed based on requirement specifications determined by their function as a network communication device and may not account for any additional processing. As a result, adding monitoring functions to, and processing high-level administration scripts on, an already deployed network communication device may introduce an additional load that was not planned for ahead of deployment. Accordingly, disclosed techniques include methods to perform monitoring and scripted administration in a comprehensive manner in an attempt to minimize impact on resource availability of the network communication device.

To implement high-level scripting interfaces to a resource constrained network communication device, an implementation is described that introduces a network analytics engine (NAE) as an executable to execute on the network communication device and provide a standard interface to common actions requested by network administration scripts. For example, many network administrations commands may repeatedly attempt to perform a common task (e.g., analyze available storage space over time, or monitor number of dropped packets for a device). These are just examples of the types of things a high-level script (or multiple different high-level scripts) may perform on a network communication device, many others are possible. In general, as described above, an executable may execute more efficiently than a corresponding script. The disclosed NAE provides application program interfaces (APIs) to high-level scripts to allow the high-level scripts to "register" for actions to be performed on their behalf by a set of small and efficient executables under the control of the NAE.

Some operating systems (OSs) may also have some analytics capabilities built into them that may not be directly accessible to (or efficiently accessible to) a high-level script. The disclosed NAE may provide this interface to further expose OS capabilities. This disclosure will discuss high-level scripts using Python as an example scripting language. Other examples of scripting languages are readily available and may similarly benefit from the disclosed techniques for interfacing their interpreter with the OS and operating environment of a network communication device.

In one example, ArubaOS-CX (AOS-CX), which runs on core aggregation and edge platforms provided by Hewlett Packard Enterprises (HPE), has Analytics capabilities embedded. This operating system may provide an example OS to support an NAE according to some disclosed embodiment. In general, the disclosed NAE may be driven by scripts provided by a system administrator or a third party, written in a high-level programming language such as Python. The NAE may provide an interface to allow one or more scripts to specify for a network device on which the scripts execute that specific portions of the system configuration, status or statistics should be monitored. The scripts may also interface through the NAE to identify what events should be detected and to use a history of monitored data to evaluate such events. Further, once an event is detected the NAE may have been instructed ahead of time (e.g., by a system administrator high-level script interfacing to the NAE) to initiate actions in response to detection of each different event.

In one example implementation, the NAE allows for dynamic configuration of its functions such that the network administrator may be able to install a NAE interface scripts (referred to herein as "Agents") at any time. Thus, providing the opportunity to add analytics features on an on-demand basis. Further, as mentioned above, scripts are written at a high-level and are human readable. These two attributes allow for more robust sharing of scripts across communities of system administrators that may share their techniques and scripts with other system administrators. Executables are generally much harder to share because of security concerns. In fact, corporate policy may prohibit a system administrator from loading executables retrieved from a development community type repository.

The disclosed NAE may address some of the following problems in addition to those stated above (and others). High-level programming languages may require more system resources (i.e. CPU, Memory, Storage) when compared to low-level programming languages that are used to create binary executables. This resource usage is mainly a side-effect of strong abstraction provided by high-level languages in that high-level scripting languages may hide low-level platform details (e.g. interpreters may automatically provide memory management, generic data structures, runtime interpretation, etc.). Therefore, the execution of a program written in a high-level programming language may use more operations and require more memory. As a result, this resource usage may impose significant limitations to embedded analytics solutions executing on a resource constrained device such as a network communication device. Further, some network communication devices (e.g., edge switches) may not have processing resources to adequately process high-level language scripts while still addressing their primary function of network communication.

In one implementation, to reduce the above-mentioned abstraction penalty of excessive resource usage but still allow for periodic execution of a scripting language interpreter, NAE may be implemented with technique to avoid having the scripts and therefore the scripting interpreter executing all of the time. Instead, the NAE may be implemented to delegate the costliest routines to different specialized programs that can execute such procedures in the most efficient way. In this disclosure two specific examples of specialized programs referred to as specialized daemons are described. However, these two specialized daemons (i.e., a Data Monitoring executable and an Event Evaluation executable) are only used as examples and other functions may be identified and replaced by additional specialized daemons as appropriate in different environments. In this context, the term "daemon" refers to a "headless" executable that does not provide any specific user interface and functions behind the scenes at the request of the NAE. These specialized functions may not have to be implemented as operating system daemons but that type of implementation may also be possible.

In one example implementation, specific Data Monitoring functions and Event Evaluation actions may be specified in the NAE Agent Script. An NAE Agent Script is a high-level script (that may be provided by the system administrator) executed on the network communication device using the script interpreter to "register" their requests via an API to the NAE. The actual processing (e.g., after registration) may be delegated to specialized daemons. Other portions of a high-level Agent Script that do not have a corresponding delegation daemon (e.g. specialized or unique analysis functions) may be called (e.g., via a callback to the Agent Script) only when a new event that corresponds to execution of that portion of the Agent Script is detected on the network communication device. The term "registration" here is simply used to refer to an Agent Script interfacing with the NAE executable to set up the appropriate execution parameters for either the Data Monitoring daemon or the Event Evaluation daemon. For example, the Agent Script may call an API to register a request to execute the Data Monitoring daemon to monitor the number of dropped packets over the last minute for the network device. In some cases, registrations may be consolidated into a single action. For example, if two different Agent Scripts request monitoring of the same data value it will only be monitored once and two different "results" of monitoring may be provided (i.e., one for each of the two Agent Scripts).

In one example implementation of NAE there are at least three functions provided for high-level script writers. These include the above-mentioned Data Monitoring, Event Evaluation, and Analytics Callback interfaces. Each of these three are described below in their own section in more detail. Also, as mentioned above, these three interfaces represent only examples of interfaces and others may be possible using similar implementation techniques as those described here. In short, these may be thought of as delegation requests (e.g., through registration) where a high-level script requests the NAE to perform a function on its behalf (e.g., using a specialized daemon style executable) and return control only when necessary to the high-level script. Accordingly, both the high-level script and the interpreter associated with them may be suspended or terminated to conserve resources on the network communication device for periods of time when they are not required to execute. Methods to efficiently suspend and resume the interpreter are also disclosed and discussed further below.

Data Monitoring

Using the Data Monitoring interface, Agent Script developers may be able to define any portion of the configuration, statistics, or state attributes associated with a network communication device as a parameter for which to build a history of changes. For example, any protocol or service available on a given switch platform may be identified as having a parameter for which to build a history of changes. In some cases, these parameters represent a data value from a local database maintained on the network control device or an OS parameter of the OS controlling the operational environment of the network control device. In this example implementation, NAE Data Monitor parameters may be specified through a Python API (or other high-level scripting API) that may be able to define a parameter (e.g., metric) that should be monitored and also identify a mathematical aggregation function (e.g. rate, moving average, ratio, etc.) that may be applied to the monitored data automatically.

As mentioned above performing data monitoring and aggregation in a Python process (that requires the Python Interpreter) may be too resource intensive in an embedded environment such as a network control device. The network control device must perform its primary function of exchanging data. In some cases, data being monitored may be significant in amount (e.g., number of data values being monitored) and data values on a network control device may change with high frequency. Further, by having data monitoring coordinated through an NAE multiple requests to monitor the same data value may be consolidated to further conserve resources. For example, the resource savings (e.g., memory and CPU) would represent the resources saved by eliminating two high-level scripts, at least one script interpreter, and redundant functions across the two scripts to perform monitoring of the single data time. This savings may be significant, especially over an extended monitoring time period. Accordingly, a specialized daemon for Data Monitoring may be implemented to collect data samples efficiently and possibly store data samples in a specialized time series database that may be local to the network control device or maintained externally to the network control device depending on implementation requirements. For example, Prometheus, represents an open source technology database that may provide these types of storage.

Event Evaluation

In addition to the above-mentioned Data Monitoring, a second interface that may be provided as an API from NAE for Agent Script developers is an Event Evaluation interface. The Event Evaluation interface may be based on data that is collected as part of the Data Monitoring capability or may be provided based on other attributes of the network control device. Using the Event Evaluation interface, Agent Script developers may be able to define system events for alerting and analysis purposes. System events may include a monitored value or system parameter crossing a pre-defined threshold or other type of run-time anomaly. For example, if CPU utilization were above 80% for 30 seconds an alert may be initiated. Many other examples are possible depending on what a system administrator desires to configure for a particular network communication device or as a system wide monitoring rule.

In this example implementation, NAE Rules may be specified using a Python API which supports a domain specific language to define events, their thresholds for alerting (e.g. average of CPU utilization over the last minute is greater than 60%). In the context of this example implementation, setting of a rule may be called an "NAE Condition." In this example, when an NAE Agent Script is installed on a network communication device, the NAE Conditions may be extracted and passed to (e.g., registered with) a specialized daemon associated with the Event Evaluation interface to translate the NAE Condition into a set of instructions that may be defined with respect to the above-mentioned specialized time series database. In this example implementation, the database management function may assist in generating alerts based on a history of monitored data. For example, to further conserve resources the database management function may be utilized as appropriate to consolidate processing required to initiating events at the request of the Event Evaluation interface.

Execution of Analysis Routines

In the context of this example NAE implementation, Analysis Routines refer to algorithms or system calls that may be executed to collect, analyze, and create further data values that, for example, may be used to assist in troubleshooting of network events. In this example implementation, once an event or anomaly is detected, one or more Analysis Routines may be used to provide more accurate information to the network administrators about what may be a root cause or contributing factor to a network issue.

In one implementation of NAE, are at least two classification types for Analysis Routines (sometimes referred to as actions). The first classification type refers to system-related commands which may be OS commands. The second classification type refers to Python callbacks that may relate back to portions of an Agent Script. For example, the portion of an Agent Script that provides customized high-level coding for an Analysis Routine. Clearly, by allowing for callbacks to an Agent Script, the disclosed Analysis Routines capability of the NAE is highly customizable by system administrators.

To explain further, system-related commands may refer to commands that once executed by the OS of the network communication device may provide more granular (e.g., specific) information about the network issue that was detected and initiated the event. One example of a system-related command may be defined as: "when the average of CPU utilization over the last minute is greater than 60% then execute 'show system resource-utilization' and 'top cpu'". In this example, 'show system resource-utilization' and 'top cpu' are command line actions (e.g., commands that may be entered on a command line of an OS) that may provide insight into what would be causing the sustained increase of CPU utilization. These commands each query the OS to ask the OS what processes are currently running and provide other OS metrics. The output of these system-related commands that are executed at the request of the NAE on the network communication device may be persisted (e.g., stored) in a way that can be retrieved later for troubleshooting purposes. That is, the output of the command line scripts may be redirected into a file or other storage mechanism, possibly with a time-stamp of when the command output was generated.

Further, under NAE control, instead of making low-level system calls to execute such commands and implementing the persistence part in an NAE Agent Script itself, both execution and persistence may be delegated to one or more specialized daemons that may execute required actions in an efficient way, including controlling the number of actions taken at the same time to avoid system resource starvation by the function attempting to detect or analyze an already compromised network communication device.

With respect to high-level script callbacks (e.g., Python callbacks), the high-level scripts may have functions or methods specified in the NAE Agent Script itself that may be executed only if an associated event happens. Such events, as described above, may be detected by the specialized daemons designed to collect data samples from the device, possibly in conjunction with a specialized time series database. To invoke a high-level script callback, a specialized daemon may send a message, containing data about the event and the NAE Rule associated with it, to another specialized daemon that controls execution of high-level script methods associated with the NAE Rule. Once the callback execution is complete, the NAE Agent Script is finished (e.g., the portion related to the callback), and the NAE Agent Script may again be unloaded along with its corresponding interpreter to free system resources. Thus, the interpreter and high-level script only use system resources when necessary based occurrence of a specific event that was monitored on their behalf via the NAE (and its support functions).

High-Level Script Orchestration

As explained above, instead of executing the real processing, APIs to interface to an NAE engine may be provided to the NAE Agent Scripts such that the NAE Agent Script processing only records metadata about what should be done on its behalf. This is generally referred to as High-Level Script Orchestration. Once an action is performed on behalf an NAE Agent Script (through the NAE) by a specialized daemon (or other function such as a system-related command), the results (e.g. output) and any collected information may be coordinated through the NAE. Thus, a user such as a system administrator may be able to configure or customize NAE using a high-level scripting language but, at the same time, the NAE infrastructure may reduce overhead created by off-loading a portion of the processing to specialized daemons.

Resource-Saving Techniques

In the disclosed NAE infrastructure, for some NAE Agent Scripts, a significant (if not all) of the Agent Script execution may be off-loaded to daemons, the high-level language runtime (interpreter) may then be hibernated (or terminated) while waiting for system events. As a result, CPU and memory are freed up in exchange of extra disk space usage (in the case of hibernation), which is usually a less costly and more available resource on a network communication device. Alternatively, if disk space is also constrained, the high-level language runtime may be shutdown instead of hibernating. Of course, shutting down the interpreter does not require extra disk space (e.g., the disk space required for hibernation), but it may require extra CPU time (as opposed to resuming from hibernation) at every startup.

To further conserver resources, the specialized daemon responsible for invocation of Analysis Routines may use a fair-share scheduling algorithm to equally allocate resources across NAE Agent Scripts. The fair-share scheduling algorithm may drop any dropping excessive pending executions for resource hungry NAE Agent Scripts. In one implementation of a fair-share scheduling algorithm, repeated executions may be dropped first. Second, any backlog of pending requests may be addressed by discarding older backlogged requests in an attempt to ensure that Analysis Routines that will be permitted to execute are executed at a time close to when the system event occurs.

Based on the above overview, it should be clear that problems addressed by this disclosure include a balance of limited resources within a network communication device between a monitoring function (secondary priority) and a network communication function (primary priority). Further, different types of events may be prioritized over others. In short, the disclosed NAE infrastructure may allow for optimizing use of available resources without impacting a primary function of a device. Although these examples have been illustrated for a network communication device, other devices exist where there may be limited embedded processing resources are available and monitoring (at least some of the time) is desirable. Those types of devices may benefit from the disclosed techniques because they could be configured to perform monitoring (e.g., at the request of high-level administration scripts) in an efficient manner so as to not impact the devices primary design function.

Having an understanding of the above overview, this disclosure will now explain a non-limiting but detailed example implementation. This example implementation is explained with reference to the figures and includes: different example devices that may benefit from the above event ingestion management techniques (FIGS. 1-2); a specific example device implementation (FIG. 3); an example functional process flow for processing and scheduling events (FIG. 4); an example method for off-loading processing from high-level scripts to specialized daemons (FIG. 5); an example method for resource saving with respect to an interpreter (FIG. 6); an example off-loading management method (FIG. 7); an example processor and computer-readable medium to implement the example off-loading method (FIG. 8); an example system of a network of computers where an NAE infrastructure may be implemented (FIG. 9); and an example processing device that may be used in one or more devices that may implement the NAE infrastructure (FIG. 10).

Referring now to FIG. 1, computer infrastructure 100 illustrates a set of computer devices, each containing at least one network communication device. In this example, network module 1 (140) through network module 4 (155) each represent a network communication device that may be part of a larger device. In this case, the larger device may be a hyperconverged node of a cluster or possibly a frame of a scaleable compute resource. Also, in this example, network device 170 illustrates a stand-alone network device such as a bridge or a router. In the context of this disclosure, a network communication device may exist independently or be part of a larger system and still have a limited amount of embedded resources that may benefit from the disclosed NAE infrastructure.

In computer infrastructure 100, network communication device 170 has a primary function of providing connectivity between independent network frames or possibly independent clusters of compute resources (e.g., cluster 1 110 and cluster 2 115). Note, in the example of FIG. 1, the links between cluster compute resources Cluster 1 (110) and Cluster 2 (115) (specifically between Network Module 2 (145) and Network Module 3 (150)) do not represent a direct connection because they pass through network communication device 170. Cluster 1 (110) and Cluster 2 (115) may be thought of as independent but related cluster resources.

For example, Cluster 2 (115) may be configured as a "hot backup" to Cluster 1 (110). Communication path 135 may provide communication directly between Cluster 1 (110) and Cluster 2 (115) to support exchange of role information and heartbeat information as appropriate. Further, in this scenario, an external network communication device 170, such as bridge/router, has been inserted to form a communication path between distinct compute resources and possibly provide additional communication to other devices (not shown) and networks (not shown). Accordingly, the state of external network device 170 may, at some point, require trouble shooting (or monitoring) and the NAE infrastructure of this disclosure may assist in collecting information to assist that effort.

As illustrated in FIG. 1, a computer infrastructure 100 may include a plurality of different types of network devices (e.g., switch, router, bridge, etc.) that may all benefit from the disclosed NAE infrastructure. Accordingly, examples of this disclosure are not limited to any particular type of network connectivity device and may be applicable to any network communication device that maintains an internal "state" of processing or connectivity when performing its function. In the example of FIG. 1, network devices with state include each instance of network switch 160 and external network device 170. A device with a strict hardware only coupling, where no processing takes place, may not be a candidate for the NAE infrastructure, because there may be no local "event" capture possible. However, any device that maintains internal adjustable configuration information may be considered to have a "state" for which an event and corresponding processing may take place in accordance with this disclosure. In cases where a device does not include internal memory, the event may be captured and processed externally to that device, but resource saving techniques may not be applicable to that particular device.

Monitors may be set up based on a network protocol, hardware resource, software resource, etc. For example, a monitor may be established to monitor available memory and CPU utilization. A monitor may also watch for a protocol specific state, such as, how many open shortest path first (OSPF) "hello" packets have been received from other devices. A monitor may identify that the rate of a particular port on a switch goes up and down too frequently and therefore may need a hardware adjustment (e.g., may have a loose of defective cable). Monitors may process idle script errors to identify a software process that is not functioning properly. Monitors may work with real-number metrics, enums, lists, or threshold crossing flags (among other types of data). In general, monitors may be used to build a history of the state of a network communication device and a particular parameter of that network communication device over a period of time that may assist in maintaining an associated network infrastructure. This period of time may be on the order of minutes, days, weeks, or months, depending on the type of data being analyzed. No specific time period is required for any particular monitoring capability, although some parameters may change in a manner where different periods of monitoring time are more appropriate than others.

Figure 2:
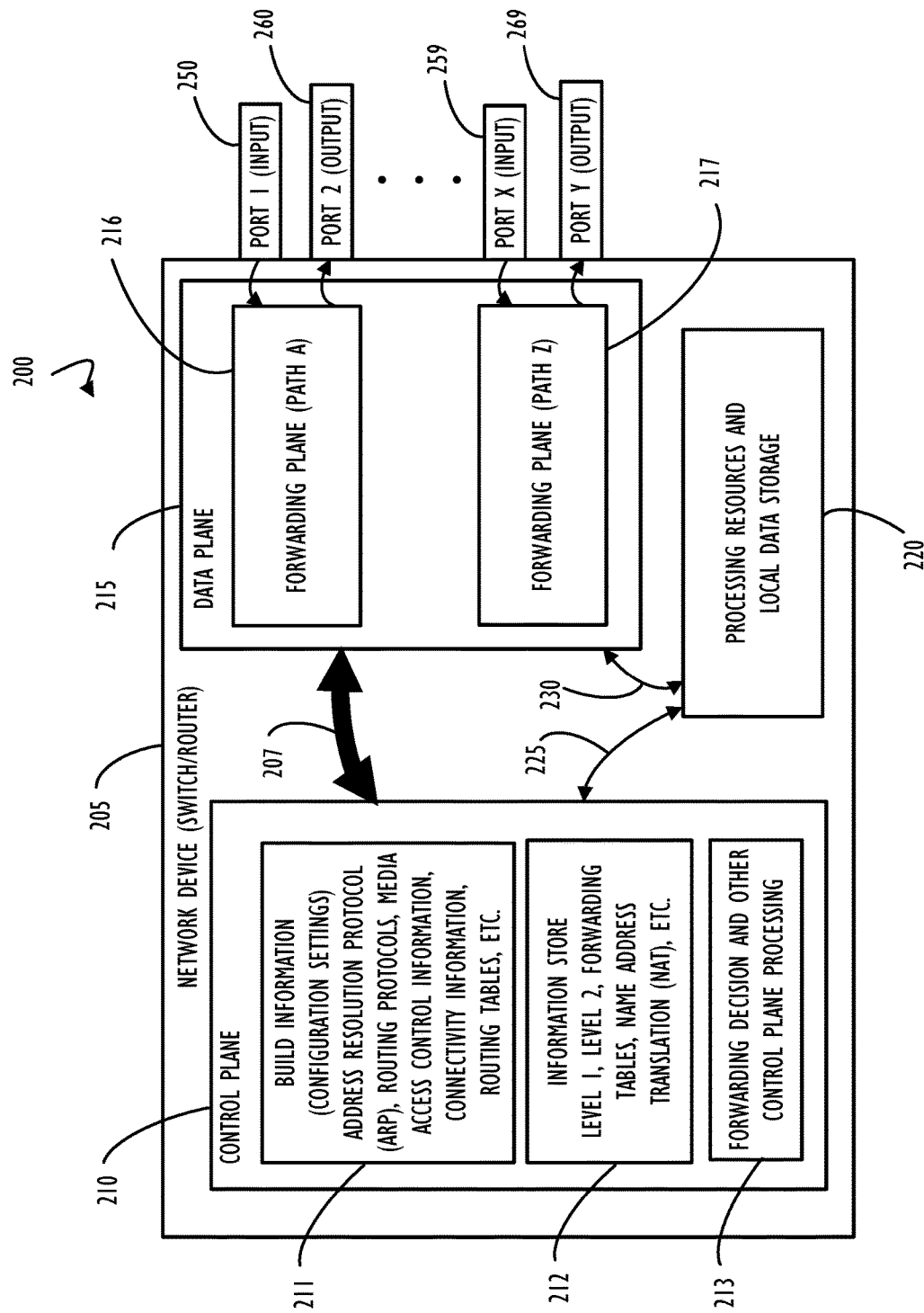
FIG. 2 is a functional block diagram representing a first example of a network device and possible functional components (logical and physical) of the network device, according to one or more disclosed implementations.

Referring now to FIG. 2, a network communication device such as a switch/router 205 is illustrated in block diagram 200. In general, a router has two types of network element components organized onto separate planes illustrated as control plane 210 and data plane 215 in block diagram 200. In addition, a typical switch/router 205 may include processing resources and local data storage 220 that may include local processing and configuration metrics for the network device. Depending on the capabilities of a particular network device, different types of processing resources and local storage may be present. In general, higher capacity network device implementations will include substantial processing resources and memory while simpler (e.g., low capacity) devices will contain less internal resources. In any case, as mentioned above, processing resources for a network communication device are typically provisioned based on a planned network need and may not have much unused capacity for other functions (e.g., monitoring).

Control plane 210, for example in a router such as switch/router 205 may be used to maintains routing tables (or a single comprehensive routing table) that list which route should be used to forward a data packet, and through which physical interface connection (e.g., output ports 260 through 269). Control plane 210 may perform this function by using internal preconfigured directives, called static routes, or by learning routes dynamically using a routing protocol. Static and dynamic routes may be stored in one or more of the routing tables. Static routes are typically preconfigured and may be considered as one or many possible network device database settings for possible monitoring. Thus, a change to an existing route or an addition of a route may trigger an event that requires processing by the monitoring system (e.g., the NAE infrastructure). The control-plane logic may strip non-essential directives from the table and build a forwarding information base (FIB) to be used by data plane 215.

A router may also use a forwarding plane (e.g., part of the data plane 215) that contains different forwarding paths for information from different ports or different destination addresses (e.g., forwarding path A 216 or forwarding path Z 217). In general, the router forwards data packets between incoming (e.g., ports 250-259) and outgoing interface connections (e.g., ports 260-259). The router forwards data packets to the correct network type using information that the packet header contains matched to entries in the FIB supplied by control plane 210. In some network implementations, a router (e.g., switch/router 205) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 2, bidirectional arrow 207 indicates that control plane 210 and data plane 215 may work in a coordinated fashion to achieve the overall capabilities of a network device such as switch/router 205. Similarly, bidirectional arrow 225 indicates that processing and local data storage resources 220 may interface with control plane 210 to provide processing and storage support for capabilities assigned to control plane 210. Bidirectional arrow 230 indicates that processing and local data storage resources 220 may also interface with data plane 215 as necessary.

Control plane 210 as illustrated in FIG. 2 includes several example functional control blocks. Additional control blocks are possible depending on the capabilities of a particular implementation of switch/router 205. Block 211 indicates that control plane 210 may have associated build information regarding a software version of control code that is currently executing on switch/router 205. In addition, the software version may include configuration settings to determine how switch/router 205 and its associated control code perform different functions. Many different configuration settings for both the software and the device itself are possible and describing each is beyond the scope of this disclosure. However, the disclosed NAE infrastructure may be designed to capture changes to as many of these configuration settings and other run-time metrics as desired to accurately provide a historical view for a network device state. Block 211 further indicates that different types of routing information and connectivity information may be known to switch/router 205 and control plane 210. Block 212 indicates that an information store may be accessible from control plane 210 and include forwarding tables or NAT information as appropriate. Block 213 indicates that control plane 210 may also be aware of forwarding decisions and other processing information. Although FIG. 2 illustrates these logical capabilities within control plane 210 they may actually be implemented outside of, but accessible to, control plane 210.

Capability to OSI Level Example Mapping

Capabilities of different types of network devices (one example of which is switch/router 205) that may benefit from the disclosed event ingestion management capabilities may vary greatly. Capabilities of different network devices are generally described with respect to how those capabilities map to the OSI model. A brief overview of the different layers and their typical capability mapping is provided in the next few paragraphs to provide context for this disclosure. However, no particular OSI mapping capability is required to practice the concepts of this disclosure and this information should not be considered limiting in any way. These are just sample devices that may benefit from the NAE infrastructure and examples of types of network functionality that may be performed by devices incorporating disclosed techniques.

An Ethernet hub is an example of a simple layer 1 network device (in contrast to a switch that operates at layer 2 and router that operates at layer 3). An Ethernet hub does not manage any of the traffic coming through it. Any packet entering a port may be repeated to the output of every other port except for the port of entry. Specifically, each bit or symbol may be repeated as it flows in.

A layer 2 switch operating as a network bridge may interconnect devices in a home or office for example. The bridge may learn the MAC address of each connected device. Bridges may also buffer an incoming packet and adapt the transmission speed to that of the outgoing port. While there are specialized applications, such as storage area networks, where the input and output interfaces are the same bandwidth, this is not always the case in general LAN applications. Generally, in LANs, a switch may be used for end user access and typically concentrates lower bandwidth and uplinks into a higher bandwidth. Interconnect between switches may be regulated using spanning tree protocol (STP) that disables links so that the resulting local area network is a tree without loops. In contrast to routers, spanning tree bridges have topologies with only one active path between two points. Shortest path bridging is a layer 2 alternative to STP that allows all paths to be active with multiple equal cost paths. Information about the topologies and other information learned by a given network device represent examples of data that may be included in a historical view from a time-series monitoring of that device.

A layer-3 switch can perform some or all of the functions normally performed by a router. In some cases, network switches are limited to supporting a single type of physical network, typically Ethernet, whereas a router may support different kinds of physical networks on different ports. As mentioned above, many combination (e.g., hybrid) devices are possible and can perform a variety of functions such that they do not fit neatly into a single category of device. Regardless, of the overall capabilities of the device, the disclosed device monitoring capability may assist in troubleshooting network anomalies.

A common layer-3 capability is awareness of IP multicast through IGMP snooping. With this awareness, a layer-3 switch may increase efficiency by delivering the traffic of a multicast group only to ports where the attached device has signaled that it wants to listen to that group. Layer-3 switches typically support IP routing between VLANs configured on the switch. Some layer-3 switches support the routing protocols that routers use to exchange information about routes between networks.

While the exact meaning of the term layer-4 switch is vendor-dependent, a layer-4 switch almost always includes a capability for network address translation (NAT) and may add some type of load distribution based on Transmission Control Protocol (TCP) sessions or advanced Quality of Service (QoS) capabilities. Further, network devices may include a stateful firewall, a VPN concentrator, or be an IPSec security gateway.

Layer-7 switches may distribute the load based on uniform resource locators (URLs), or by using some installation-specific technique to recognize application-level transactions. A layer-7 switch may include a web cache and participate in a content delivery network (CDN).

Figure 3:
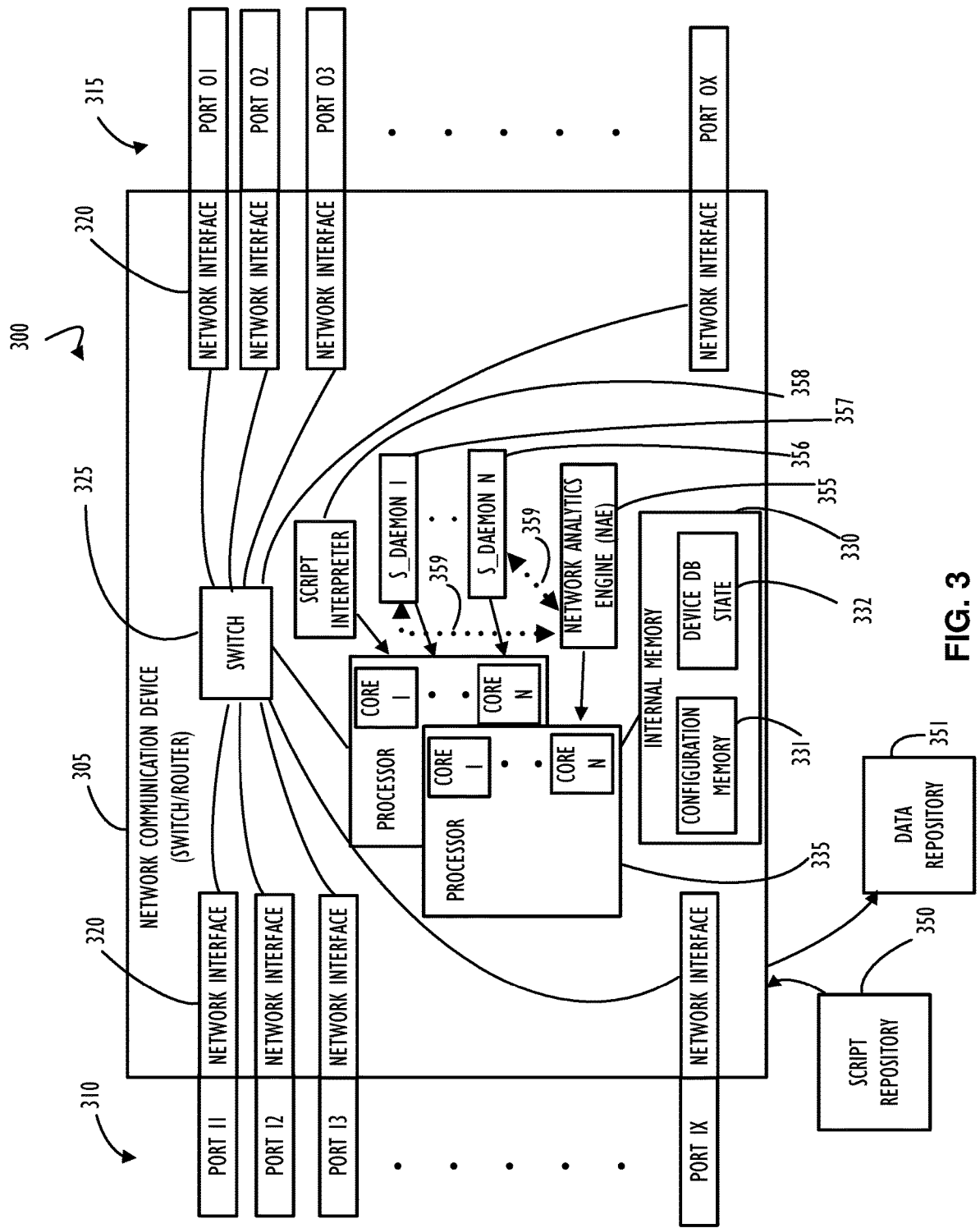
FIG. 3 is a block diagram representing a second example of a network device including a network analytics engine (NAE) component, a script interpreter component, and a script repository, according to one or more disclosed implementations.

Referring now to FIG. 3, a simplified network communication device 305 such as a switch/router is illustrated in block diagram 300. In general, a network communication device 305 may include an internal switch 325 that communicatively connects a set of input/output ports 310 via a logical or physical network interface 320 to a set of input/output ports 315 that also have an associated logical or physical network interface 320. The communication paths established by switch 325 may be controlled by one or more processors 335 (and possibly corresponding hardware logic) and the processors 335 may obtain and store information in internal memory 330. Each of the one or more processors 335 may include any number of cores as indicated by CORE 1 through CORE N of processors 335.

Network device 305 represents a relatively basic switch or router architecture. In addition to standard components, network device 305 is illustrated to include NAE 355 communicatively coupled to internal memory 330 that includes a specific portion thereof, referred to as device DB state memory 332 device DB state memory 332 represents a portion of memory used to implement a time-series database such as that discussed above. This time-series database may have a database process (not shown) to assist in maintaining data values and interfacing to NAE 355 to further optimize resource usage. Of course, NAE infrastructure functions may be able to register to monitor to any memory area, but, for this example, device DB state 332 is intended to represent that logical area of memory where specialized database assistance to NAE 355 may be performed. Configuration memory 331 represents an area of memory to store device configuration parameters that may also be monitored using NAE 355.

Also shown in FIG. 3, is script repository 350 and data repository 351. Each of these represent repositories that may be implemented on an external system such as a data server. Communication from network communication device 305 to script repository 350 may be used to install NAE Agent Scripts. Communication from data repository 351 may be used to store data for analysis of historical event data on a processing device other than network communication device 305. In some implementations it may be possible to send some information from data repository 351 to network communication device 305, such as timing and control data (e.g., to provide buffered transfer of information), but the majority of data specifically related to monitoring is expected to be event data that is transmitted in an outbound direction from network communication device 305 when communicating with data repository 351.

The exchange of outbound information may be facilitated by NAE 355 or another specialized daemon (not shown) executing on a core of one of processors 335. To minimize frequent transmission of small amounts of network traffic from network communication device 305 to data repository 351 some buffering may be implemented on network communication device 305. However, recall that network communication device 305 may have limited available resources so this local buffering may be optional and sometimes disabled. To facilitate buffering, periodic, responsive to filling a buffer of changes, or on demand triggers may be implemented to initiate transfer of data from network communication device 305 to data repository 351.

Also shown in FIG. 3 are specialized daemons S_Daemon 1 (357) through S_Daemon N (356). The ellipses between these elements indicates that any number of daemons is possible depending on implementation requirements. Dashed bi-directional arrows 359 indicate the registration and communication interaction (e.g., callbacks, alerts, events, etc.) between the specialized daemons and NAE 355. Script interpreter 358 is also illustrated and will execute (when active) on one of processors 335.

Figure 4:
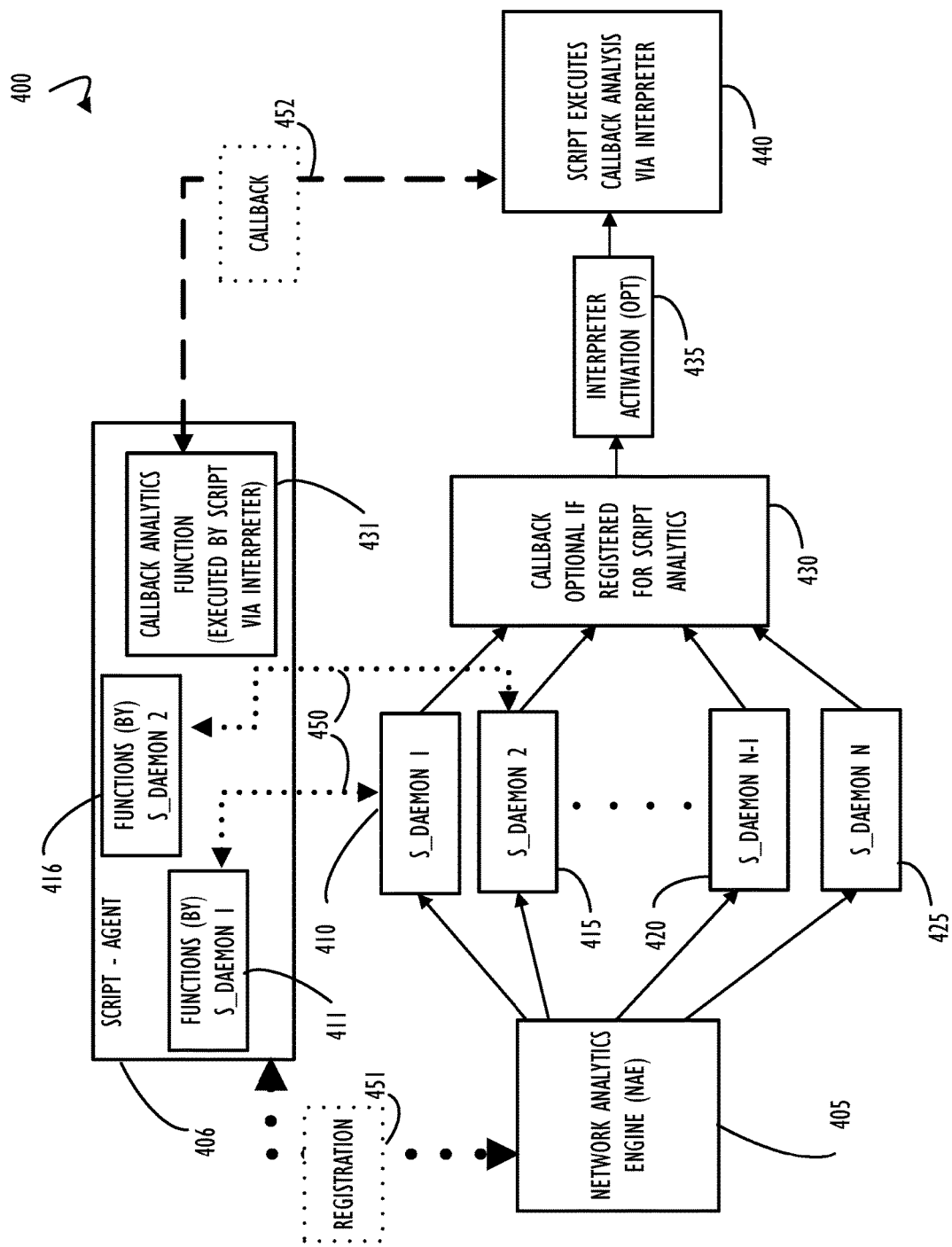
FIG. 4 is a block diagram representing details of one example NAE functional component and a control flow for processing daemons to perform functions on behalf of high-level scripting requests, according to one or more disclosed implementations.

Referring to FIG. 4, functional block diagram 400 illustrates one possible implementation of NAE processing, according to disclosed embodiments. NAE 405 represents the analytics control engine interfacing with S_Daemon 1 (410), S_Daemon 2 (415), S_Daemon N-1 (420), and S_Daemon N (425). Block 430 indicates that each of the daemons may initiate a callback as appropriate to cause activation of a script interpreter if required as shown at block 435. Block 440 indicates that each callback may cause a portion of a NAE Agent Script (431) to execute via callback interface 452.

Block 406 represents an NAE Agent Script that may be composed of different functional blocks (logically represented). In this example, NAE Agent Script 405 has three logical component parts that include functions to be registered (451) with NAE 405 for execution by S_Daemon 1 (410) as indicated by Functions 416 and functions to be registered (451) with NAE 405 for execution by S_Daemon 2 (425) as indicated by Functions 411. Dashed bi-directional arrows 450 illustrate the logical connection between each of the Functions and the daemon that will perform processing on their behalf.

Figure 5:
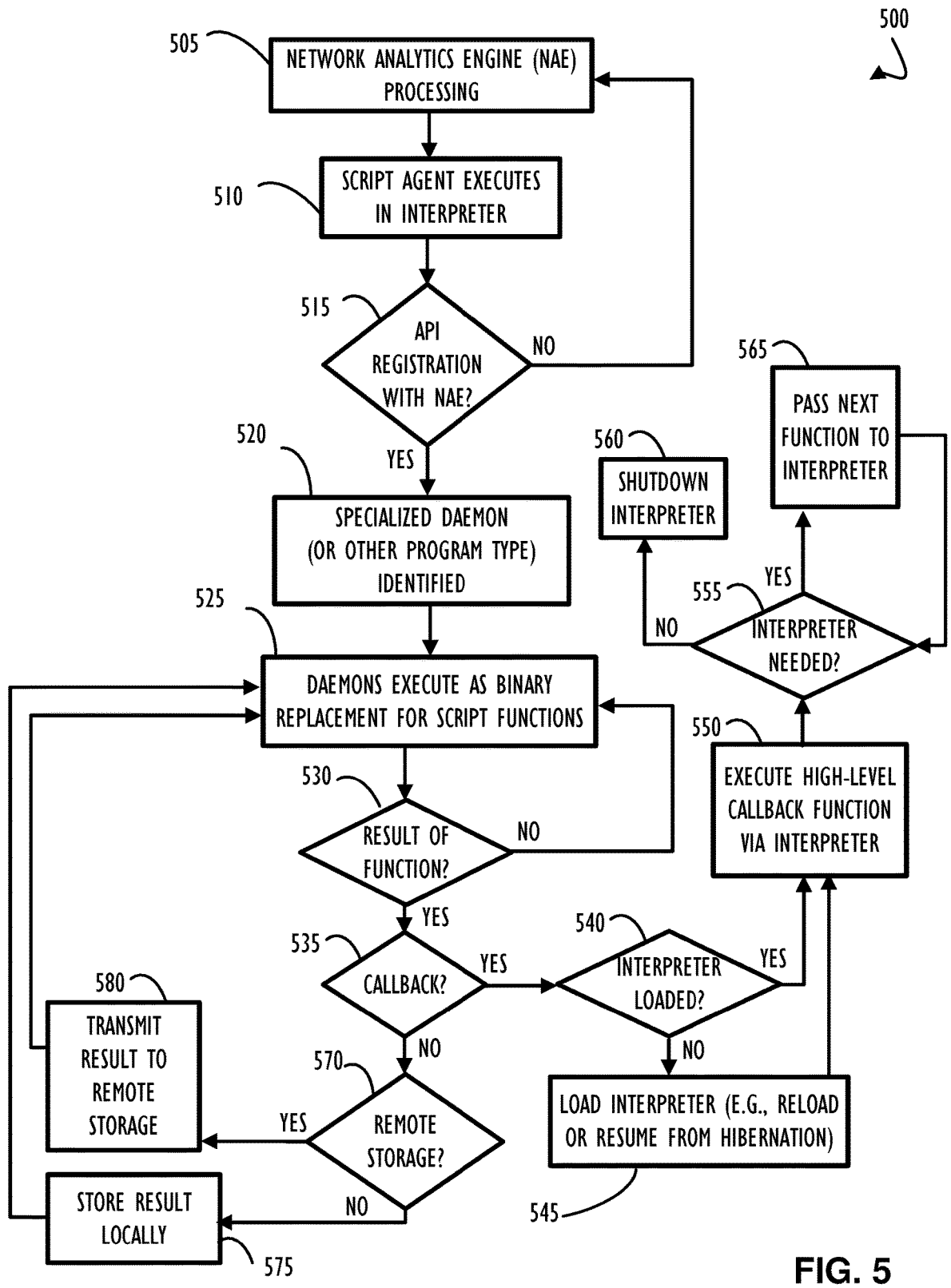
FIG. 5 is an example flowchart illustrating function registration, and corresponding off loaded processing for each requested function to a specialized daemon, as might be performed using high-level interface techniques according to one or more disclosed implementations.

Referring to FIG. 5, there is shown a flow diagram depicting one example process 500 for registration by an NAE Agent Script for monitoring and/or event generation based on a database change or analytical result, according to one or more disclosed implementations. Process 500 begins at block 505 where NAE is processing. Block 510 indicates that an NAE Script Agent may execute in an interpreter and possibly register to off-load a portion of its processing. Decision 515 indicates that the NAE Script Agent may optionally register for off-load processing. If not, the NO prong of decision 515, flow returns to block 505 with no off-loading. If there is offloading (e.g., via an API call of the NAE Script Agent), the YES prong of decision 515, flow continues to block 520 where a specialized daemon (or possibly a system-related command) may be identified (e.g., registered for execution). Block 525 indicates that processing may be off-loaded from the NAE Script Agent as described above.

Decision 530 indicates that a determination may be made as to if an off-loaded function needs to provide a result back to another process. If not, the NO prong of decision 530, flow returns to block 525 and processing continues. However, if a return result is required, the YES prong of decision 530, flow continues to decision 535. At decision 535 it may be determined if a callback is to be initiated. If not, the NO prong of decision 535, flow continues to decision 570 where a determination may be made as to sending a result to remote storage. If not, the NO prong of decision 570, the result may be stored locally as indicated in block 575 and flow returns to block 525. If remote storage is determined, the YES prong of decision 570, flow continues to block 580 where transmission to remote storage may be initiated. Of course, although not shown in block 580, buffering of transmission may be implemented to minimize the number of outbound transfers of information from the network communication device to remote storage.

Returning to decision 535, if a callback is required, the YES prong of decision 535, flow continues to decision 540 where a determination of the status of an appropriate script interpreter may be determined. If the script interpreter is not loaded, the NO prong of decision 540, flow continues to block 545 to initiate activation of the script interpreter (See FIG. 6). If the interpreter is already available, the YES prong of decision 540, no load is necessary. In either case, flow exiting from decision 540 arrives at block 550 where the high-level interpreter may be used to execute the callback portion of an NAE Agent Script. Upon completion of that portion, flow continues to decision 555 where a determination may made as to if the interpreter still needs to be loaded. If so, the YES prong of decision 555, a next execution portion (e.g., from a different NAE Script Agent) may be provided to the interpreter for execution. This process may repeat as indicated by the return from 565 to decision 555 for as long as the interpreter is required. When the interpreter has completed its execution and no other pending requests are ready, the NO prong of decision 555, flow continues to block 560 where the interpreter may be shutdown as necessary (e.g., either terminated or hibernated).

Figure 6:
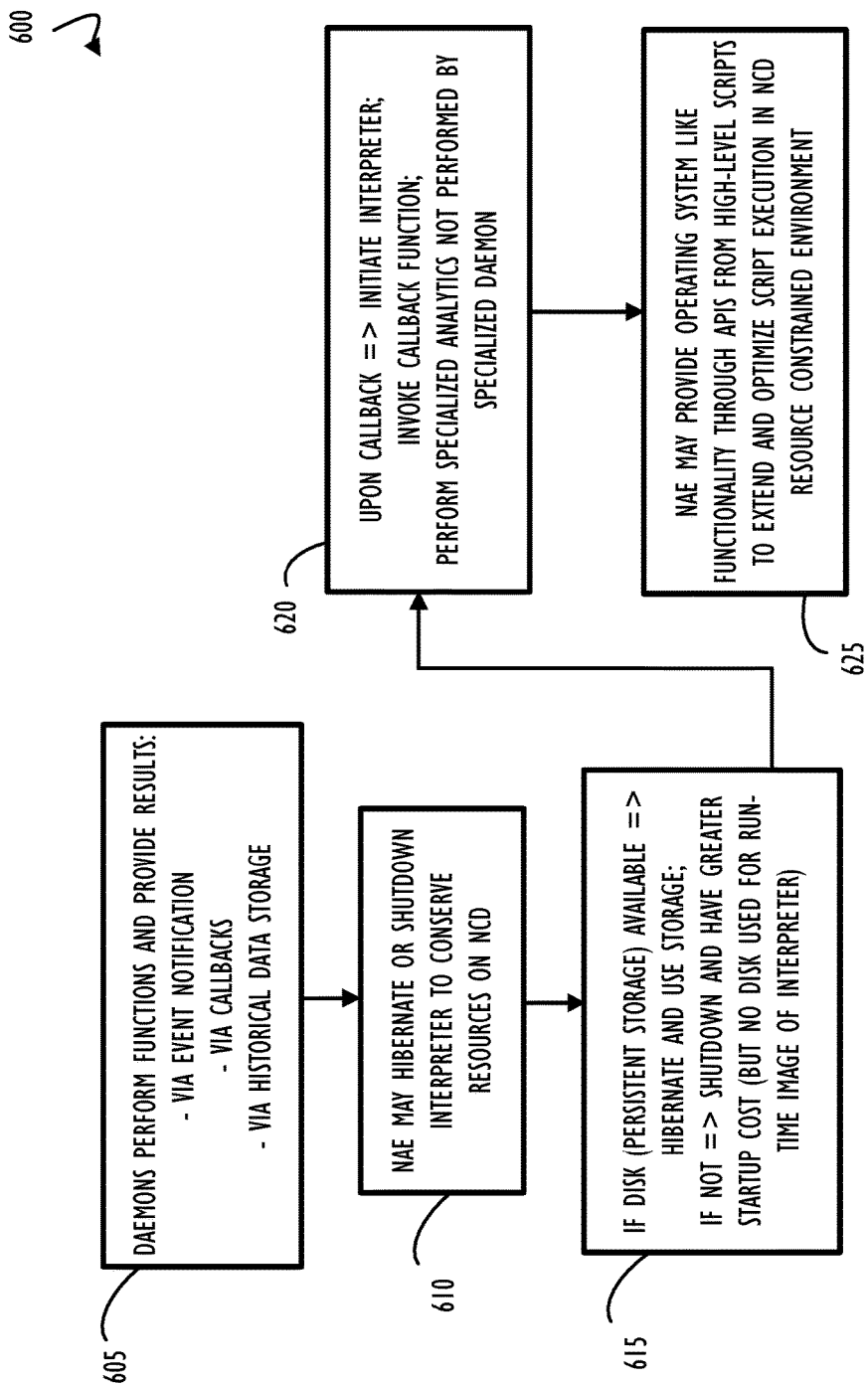
FIG. 6 is an example flowchart illustrating a callback implementation to invoke logic of a high-level script that may not have an appropriate corresponding offload daemon, according to one or more disclosed implementations.

Referring to FIG. 6, there is shown a flow diagram illustrating a resource saving method with respect to a script interpreter and NAE offloading of processing, according to one or more disclosed implementations. Process 600 begins at block 605 where a daemon may perform functions on behalf of an NAE Agent Script. These functions may include event notification, callbacks, or historical data storage (among other possibilities). Block 610 indicates that the NAE may hibernate or shutdown the interpreter to save resources on the network communication device. Block 615 indicates how a determination of hibernation versus shutdown may be determined. For example, if disk is not at a premium then hibernate otherwise shutdown at the cost of possible CPU resource usage. Of course, this determination may be made dynamically by the network communication device based on its current evaluation with respect to resource availability. Block 620 indicates that upon a callback that requires the interpreter (e.g., not a system-related command callback) the interpreter may be utilized to process the required specialized code that could not be offloaded. Block 625 indicates that the NAE may provide OS like functionality through APIs to high-level scripts in a resource constrained environment such as a network communication device.

Figure 7:
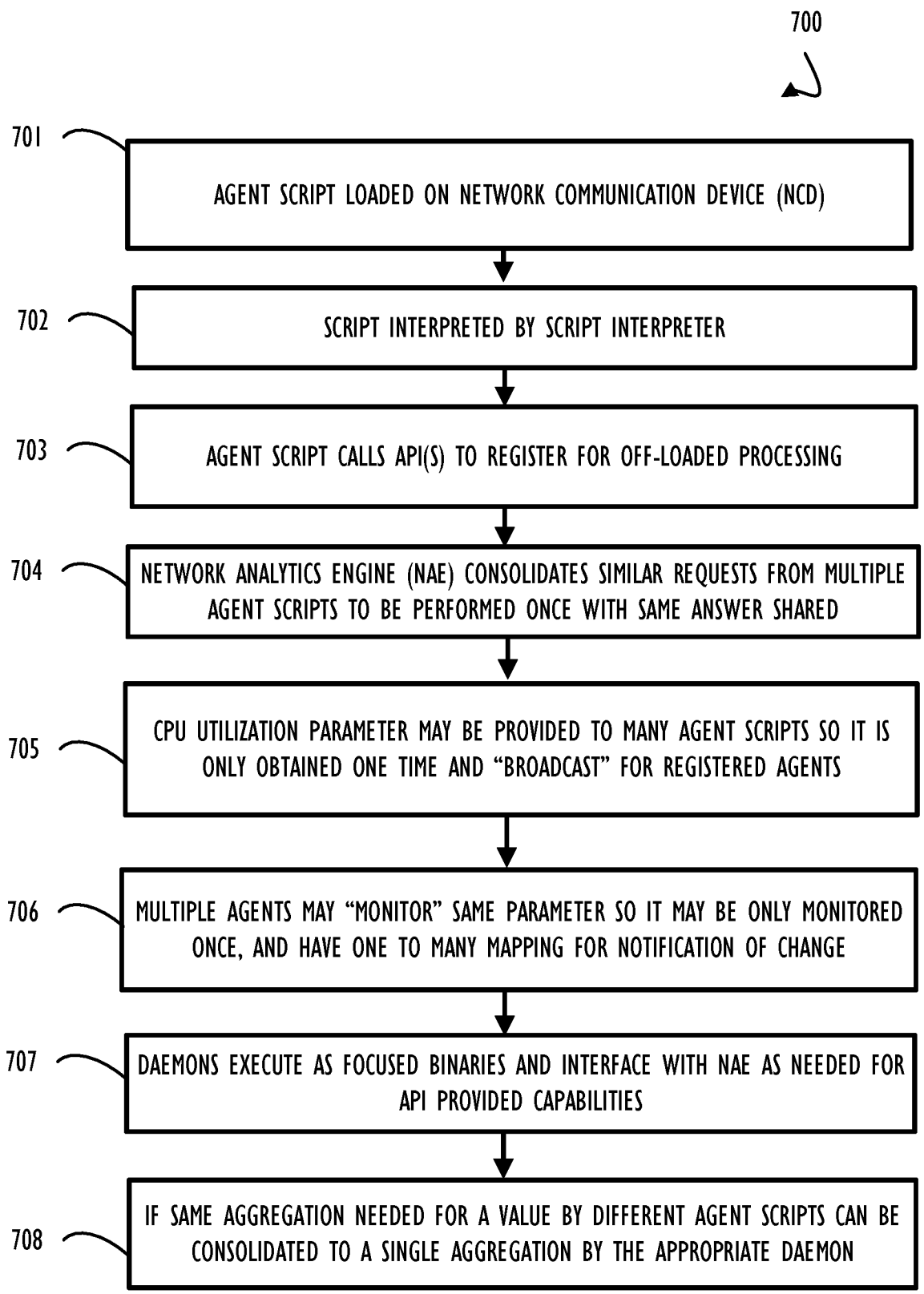
FIG. 7 is an example method that may be performed within a computer network environment on one or more network communication devices to perform high-level interface techniques, according to one or more disclosed implementations.

FIG. 7 illustrates an example method 700 that may be used to perform NAE assisted monitoring and Agent Script registration techniques on a network communication device, according to one or more disclosed embodiments. Example method 700 begins at block 701 where an NAE Agent Script may be loaded on a network communication device. Block 702 indicates that the script may be interpreted by its appropriate high-level script interpreter. Block 703 indicates that the NAE Agent Script may call APIs to register for off-loaded processing. Block 704 indicates that NAE may consolidate replicated requests from different NAE Script Agents so that common monitoring functions (e.g., monitoring of the same data) may be reduced to a single monitoring action. Block 705 indicates that results from a common monitor action may be "broadcast" and provided to many NAE Script Agents from a single monitoring action. Block 706 indicates that there may be a many to one mapping for a notification of change by the NAE infrastructure. Block 707 indicates that daemons may execute on behalf of the NAE Agent Scripts as small optimized executables to reduce resource usage. Block 708 indicates that if multiple NAE Agent Scripts request a common aggregation that too may be consolidated into a single aggregation and the results provided to multiple subscribers (e.g., registered NAE Agent Scripts or external data sources).

Figure 8:
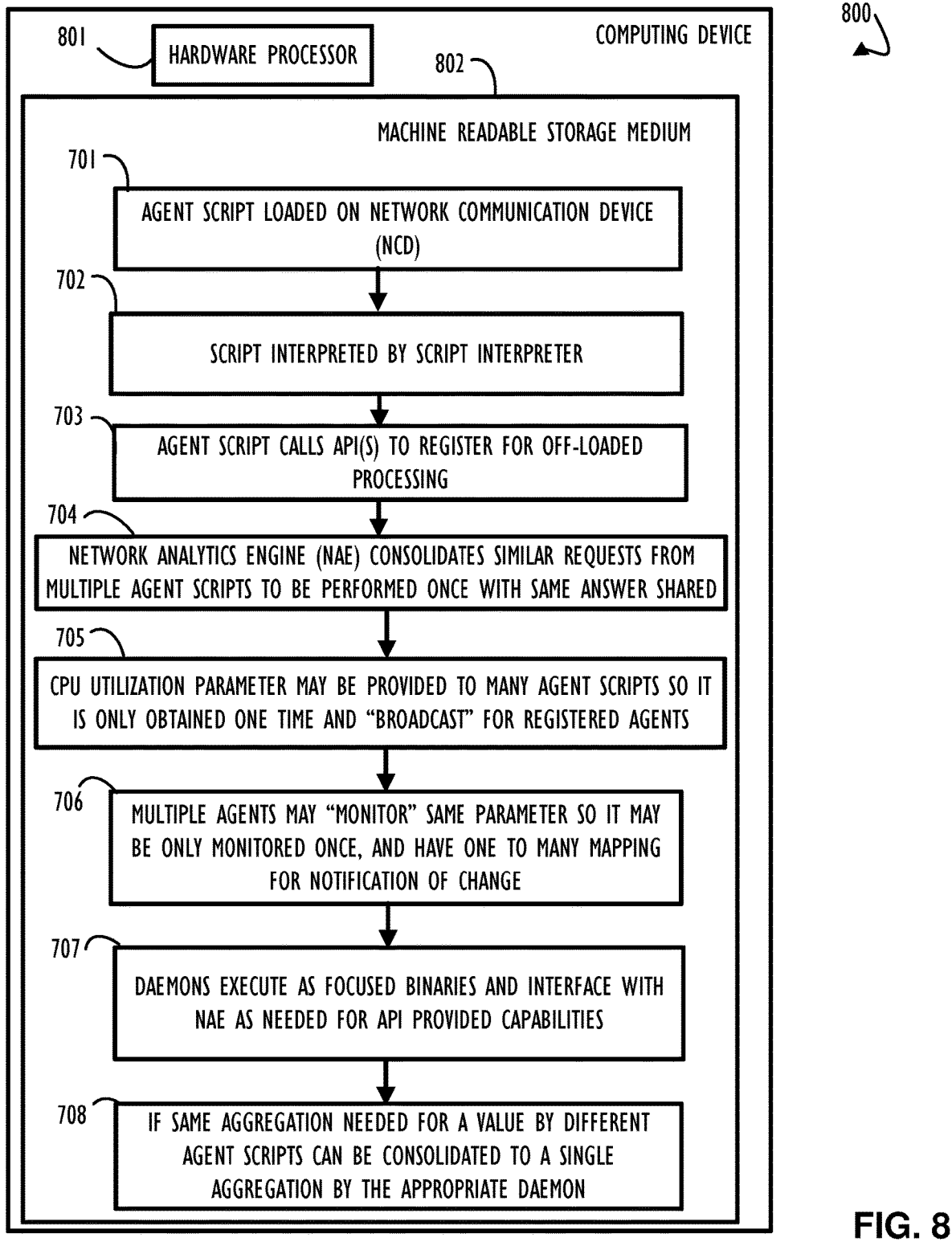
FIG. 8 is an example computing device with a hardware processor and accessible machine-readable instructions that might be used for performing high-level analytics with low overhead on resources of an embedded device, according to one or more disclosed example implementations.

FIG. 8 is an example computing device 800, with a hardware processor 801, and accessible machine-readable instructions stored on a machine-readable medium 802 for performing method 700, according to one or more disclosed example implementations. FIG. 8 illustrates computing device 800 configured to perform the flow of method 700 as an example. However, computing device 800 may also be configured to perform the flow of other methods, techniques, functions, or processes described in this disclosure. In this example of FIG. 8, machine-readable storage medium 802 includes instructions to cause hardware processor 801 to perform blocks 701-708 discussed above with reference to FIG. 7.

A machine-readable storage medium, such as 802 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 9:
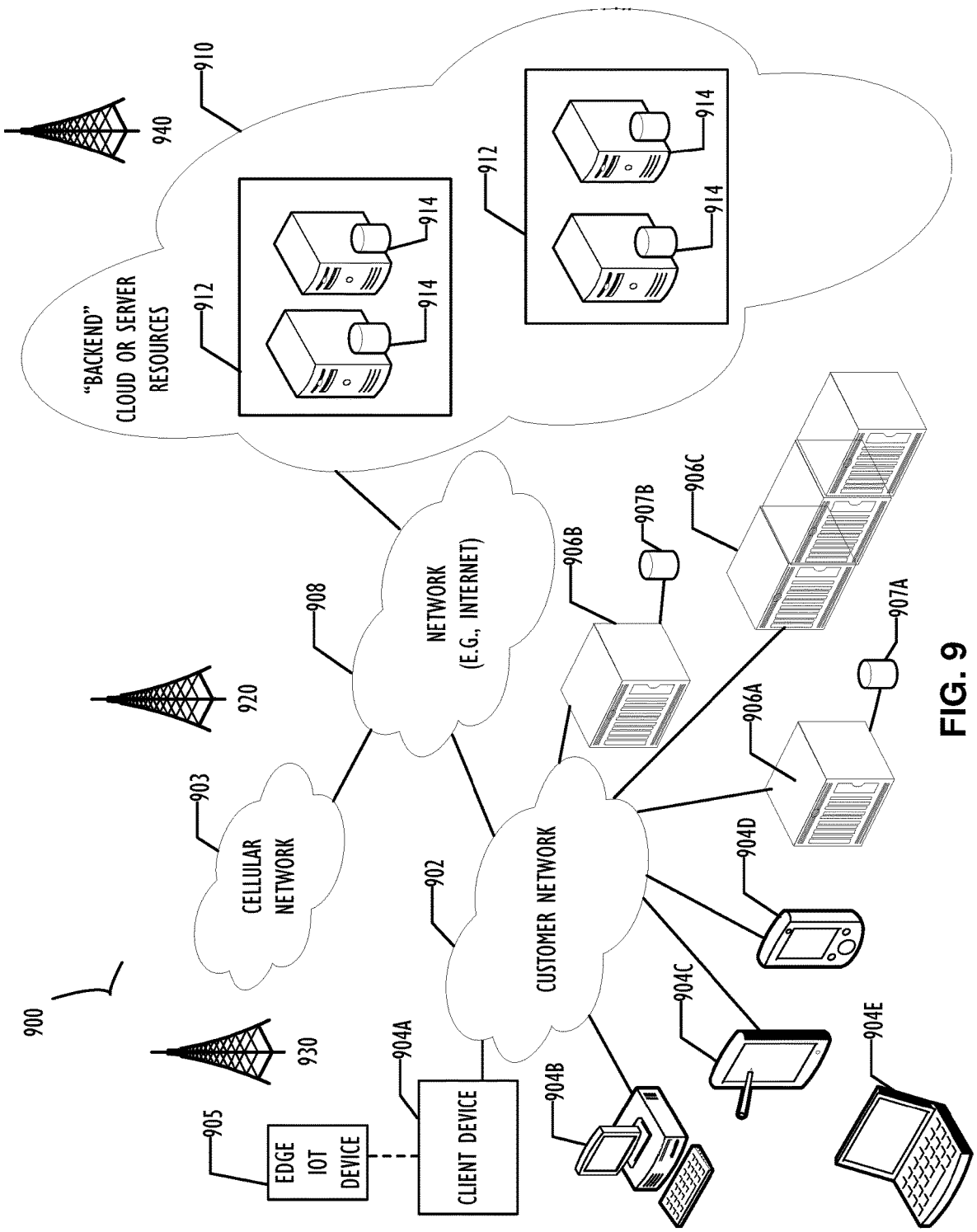
FIG. 9 represents a computer network infrastructure that may be used to implement all or part of the disclosed high-level interface to a NAE, according to one or more disclosed implementations.
Figure 10:
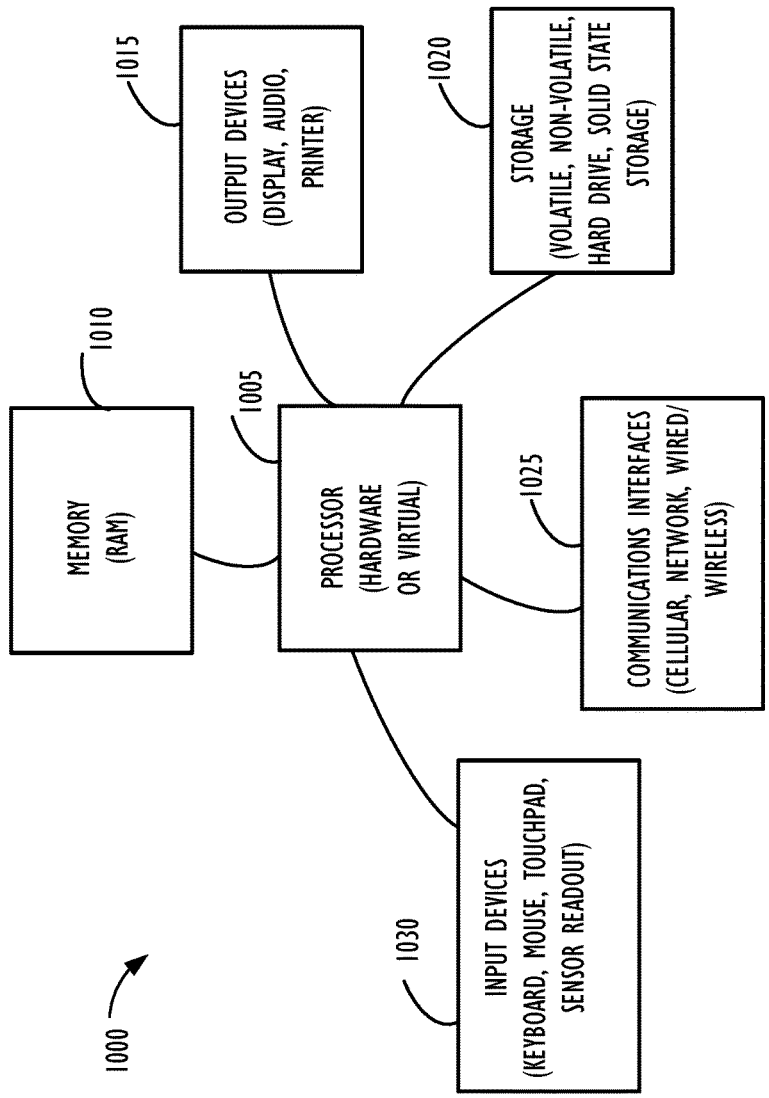
FIG. 10 illustrates a computer processing device that may be used to implement the functions, modules, processing platforms, execution platforms, communication devices, and other methods and processes of this disclosure.

FIG. 9 represents a computer network infrastructure that may be used to implement all or part of the NAE infrastructure, according to one or more disclosed implementations. Network infrastructure 900 includes a set of networks where embodiments of the present disclosure may operate. Network infrastructure 900 comprises a customer network 902, network 908, cellular network 903, and a cloud service provider network 910. In one embodiment, the customer network 902 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFI® networks, or Bluetooth®. In another embodiment, customer network 902 represents an enterprise network that could include or be communicatively coupled to one or more local area networks (LANs), virtual networks, data centers and/or other remote networks (e.g., 908, 910). In the context of the present disclosure, customer network 902 may include multiple devices configured with the disclosed event ingestion management techniques such as those described above. Also, one of the many computer storage resources in customer network 902 (or other networks shown) may be configured to store the historical event repository 350 of FIG. 3.

As shown in FIG. 9, customer network 902 may be connected to one or more client devices 904A-E and allow the client devices 904A-E to communicate with each other and/or with cloud service provider network 910, via network 908 (e.g., Internet). Client devices 904A-E may be computing systems such as desktop computer 904B, tablet computer 904C, mobile phone 904D, laptop computer (shown as wireless) 904E, and/or other types of computing systems generically shown as client device 904A.

Network infrastructure 900 may also include other types of devices generally referred to as Internet of Things (IoT) (e.g., edge IOT device 905) that may be configured to send and receive information via a network to access cloud computing services or interact with a remote web browser application (e.g., to receive configuration information).

FIG. 9 also illustrates that customer network 902 includes local compute resources 906A-C that may include a server, access point, router, or other device configured to provide for local computational resources and/or facilitate communication amongst networks and devices. For example, local compute resources 906A-C may be one or more physical local hardware devices, such as the different configurations of NN processing systems outlined above. Local compute resources 906A-C may also facilitate communication between other external applications, data sources (e.g., 907A and 907B), and services, and customer network 902. Local compute resource 906C illustrates a possible processing system cluster with three nodes. Of course, any number of nodes is possible, but three are shown in this example for illustrative purposes.

Network infrastructure 900 also includes cellular network 903 for use with mobile communication devices. Mobile cellular networks support mobile phones and many other types of mobile devices such as laptops etc. Mobile devices in network infrastructure 900 are illustrated as mobile phone 904D, laptop computer 904E, and tablet computer 904C. A mobile device such as mobile phone 904D may interact with one or more mobile provider networks as the mobile device moves, typically interacting with a plurality of mobile network towers 920, 930, and 940 for connecting to the cellular network 903. In the context of the current monitoring and event management, user alerts as to NAE actions may be configured to provide an end-user notification. In some implementations, this notification may be provided through network infrastructure 900 directly to a system administrators cellular phone.

Although referred to as a cellular network in FIG. 9, a mobile device may interact with towers of more than one provider network, as well as with multiple non-cellular devices such as wireless access points and routers (e.g., local compute resources 906A-C). In addition, the mobile devices may interact with other mobile devices or with non-mobile devices such as desktop computer 904B and various types of client device 904A for desired services. Although not specifically illustrated in FIG. 9, customer network 902 may also include a dedicated network device (e.g., gateway or router) or a combination of network devices (not shown) that implement a customer firewall or intrusion protection system. These types of devices may be configured to provide an interface to an event management processing system of this disclosure.

FIG. 9 illustrates that customer network 902 is coupled to a network 908. Network 908 may include one or more computing networks available today, such as other LANs, wide area networks (WAN), the Internet, and/or other remote networks, in order to transfer data between client devices 904A-D and cloud service provider network 910. Each of the computing networks within network 908 may contain wired and/or wireless programmable devices that operate in the electrical and/or optical domain.

In FIG. 9, cloud service provider network 910 is illustrated as a remote network (e.g., a cloud network) that is able to communicate with client devices 904A-E via customer network 902 and network 908. The cloud service provider network 910 acts as a platform that provides additional computing resources to the client devices 904A-E and/or customer network 902. In one embodiment, cloud service provider network 910 includes one or more data centers 912 with one or more server instances 914.

FIG. 10 illustrates a computer processing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer readable medium comprising computer executable instructions stored thereon that when executed by one or more processing units, cause the one or more processing units to perform a method to provide offloading of processing from high-level interpreted scripts, the method comprising:

obtaining a script agent file including a call to an application program interface (API) of a network analytics engine (NAE) to register a data value in a database of a network communication device for monitoring; registering the data value for monitoring with assistance of a specialized monitor executable available on the network communication device; monitoring the data value via the specialized monitor executable; and generating an event based on a change in the data value, the event initiated by the specialized monitor executable while the script agent file and the interpreter for the script agent file are not executing on the network communication device.

2. The non-transitory computer readable medium of claim 1, wherein registering the data value for monitoring comprises registering the data value for monitoring via a database control process communicating with the specialized monitor executable.

3. The non-transitory computer readable medium of claim 2, wherein generating an event based on a change in data value comprises the database control process initiating the event by communicating an indication of the event to the specialized monitor executable.

4. The non-transitory computer readable medium of claim 1, wherein the method further comprises:

initiating a callback to a portion of the script agent file based on a change in the data value, the callback initiated by the NAE in response to a request from the specialized monitor executable.

5. The non-transitory computer readable medium of claim 4, wherein the NAE initiates load of the interpreter for the script agent file and the portion of the script agent file to process the callback using high-level interpreted commands from the portion of the script agent file.

6. The non-transitory computer readable medium of claim 1, wherein the method further comprises:

receiving a call from the script agent file to an API of the NAE to register an event for evaluation on the network communication device with assistance of a specialized event evaluation executable different from the specialized monitoring executable;

executing the specialized event evaluation executable on the network communication device to detect occurrence of the registered event; and initiating a system-related command on the network communication device in response to detection of the occurrence of the registered event by the specialized event evaluation executable.

7. The non-transitory computer readable medium of claim 1, wherein the method further comprises:

offloading a plurality of functions from the script agent file to a corresponding one or more specialized executables in addition to the specialized monitor executable, wherein the corresponding one or more specialized executables perform the plurality of functions on behalf of the script agent file while the script agent file is not loaded for execution.

8. A computer-implemented method comprising:

obtaining a script agent file including a call to an application program interface (API) of a network analytics engine (NAE) to register a data value in a database of a network communication device for monitoring; registering the data value for monitoring with assistance of a specialized monitor executable available on the network communication device; monitoring the data value via the specialized monitor executable; and generating an event based on a change in the data value, the event initiated by the specialized monitor executable while the script agent file and the interpreter for the script agent file are not executing on the network communication device.

9. The computer-implemented method of claim 8, wherein registering the data value for monitoring comprises registering the data value for monitoring via a database control process communicating with the specialized monitor executable.

10. The computer-implemented method of claim 9, wherein generating an event based on a change in data value comprises the database control process initiating the event by communicating an indication of the event to the specialized monitor executable.

11. The computer-implemented method of claim 8, further comprising:

initiating a callback to a portion of the script agent file based on a change in the data value, the callback initiated by the NAE in response to a request from the specialized monitor executable.

12. The computer-implemented method of claim 11, wherein the NAE initiates load of the interpreter for the script agent file and the portion of the script agent file to process the callback using high-level interpreted commands from the portion of the script agent file.

13. The computer-implemented method of claim 8, further comprising:

receiving a call from the script agent file to an API of the NAE to register an event for evaluation on the network communication device with assistance of a specialized event evaluation executable different from the specialized monitoring executable;

executing the specialized event evaluation executable on the network communication device to detect occurrence of the registered event; and initiating a system-related command on the network communication device in response to detection of the occurrence of the registered event by the specialized event evaluation executable.

14. The computer-implemented method of claim 8, further comprising:

offloading a plurality of functions from the script agent file to a corresponding one or more specialized executables in addition to the specialized monitor executable, wherein the corresponding one or more specialized executables perform the plurality of functions on behalf of the script agent file while the script agent file is not loaded for execution.

15. A network communication device, comprising:

one or more processing units having multiple cores;

a first memory storing a local database representing state information about the computer device; and a second memory storing instructions, that when executed by the one or more processing units, cause the one or more processing units to provide a network analytics engine (NAE) to provide an offloading method, the method comprising:

obtaining a script agent file including a call to an application program interface (API) of the NAE to register a data value in a database of a network communication device for monitoring; registering the data value for monitoring with assistance of a specialized monitor executable available on the network communication device; monitoring the data value via the specialized monitor executable;

and generating an event based on a change in the data value, the event initiated by the specialized monitor executable while the script agent file and the interpreter for the script agent file are not executing on the network communication device.

16. The network communication device of claim 15, wherein registering the data value for monitoring comprises registering the data value for monitoring via a database control process communicating with the specialized monitor executable.

17. The network communication device of claim 16, wherein generating an event based on a change in data value comprises the database control process initiating the event by communicating an indication of the event to the specialized monitor executable.

18. The network communication device of claim 15, wherein the method further comprises: initiating a callback to a portion of the script agent file based on a change in the data value, the callback initiated by the NAE in response to a request from the specialized monitor executable, wherein the NAE initiates load of the interpreter for the script agent file and the portion of the script agent file to process the callback using high-level interpreted commands from the portion of the script agent file.

19. The network communication device of claim 15, wherein the method further comprises:

receiving a call from the script agent file to an API of the NAE to register an event for evaluation on the network communication device with assistance of a specialized event evaluation executable different from the specialized monitoring executable;

executing the specialized event evaluation executable on the network communication device to detect occurrence of the registered event; and initiating a system-related command on the network communication device in response to detection of the occurrence of the registered event by the specialized event evaluation executable.

20. The network communication device of claim 15, wherein the method further comprises:

offloading a plurality of functions from the script agent file to a corresponding one or more specialized executables in addition to the specialized monitor executable, wherein the corresponding one or more specialized executables perform the plurality of functions on behalf of the script agent file while the script agent file is not loaded for execution.

* * * * *